United States Patent [19]

Starry

[11] Patent Number: 5,575,413
[45] Date of Patent: Nov. 19, 1996

[54] GOLF BAG HOLDER APPARATUS

[76] Inventor: William L. Starry, Rte. 3 Box 137A, Sauk Centre, Minn. 56378

[21] Appl. No.: 405,362

[22] Filed: Mar. 16, 1995

[51] Int. Cl.$^6$ ...................................................... B60R 9/08
[52] U.S. Cl. ...................... 224/274; 248/96; 280/DIG. 5
[58] Field of Search .................................... 224/274, 545; 211/70.2; 248/96; 280/764, DIG. 5

[56] References Cited

U.S. PATENT DOCUMENTS

| | | | |
|---|---|---|---|
| D. 269,472 | 6/1983 | Avis . | |
| 3,042,443 | 7/1962 | Laher | 248/96 X |
| 3,580,533 | 5/1971 | Nordland . | |
| 3,884,439 | 5/1975 | Jeninga | 280/DIG. 5 |
| 5,076,651 | 12/1991 | White . | |
| 5,088,635 | 2/1992 | Taylor et al. | 224/274 |
| 5,109,938 | 5/1992 | Vautelin et al. | 280/DIG. 5 |
| 5,199,581 | 4/1993 | Arnold | 248/96 X |
| 5,215,194 | 6/1993 | Blanford et al. . | |
| 5,226,666 | 7/1993 | Dinkens et al. | 211/70.2 X |

*Primary Examiner*—Renee S. Luebke

[57] ABSTRACT

A golf bag holder apparatus is adapted to be supported by a sub-base support and includes a first support assembly which includes a first base, a first high-form bag support assembly, and a first low-form bag support assembly adjacent to the first high-form bag support assembly on the first base. The first low-form bag support assembly includes a first bag retention portion projecting upward from the first base. The golf bag holder apparatus also includes a second support assembly which includes a second base, a second high-form bag support assembly, and a second low-form bag support assembly adjacent to the second high-form bag support assembly on the second base. The second low-form bag support assembly includes a second bag retention portion projecting upward from the second base. The sub-base support is adapted to support the first support assembly and the second support assembly such that the first high-form bag support assembly is located opposite the second low-form bag support assembly and such that the second high-form bag support assembly is located opposite the first low-form bag support assembly. A transverse strut may be connected between the first high-form bag support assembly and the second high-form bag support assembly. Rain shield assemblies may be connected to the respective first and second high-form bag support assemblies. The first high-form bag support assembly may include exterior walls which define an interior storage chamber.

9 Claims, 4 Drawing Sheets

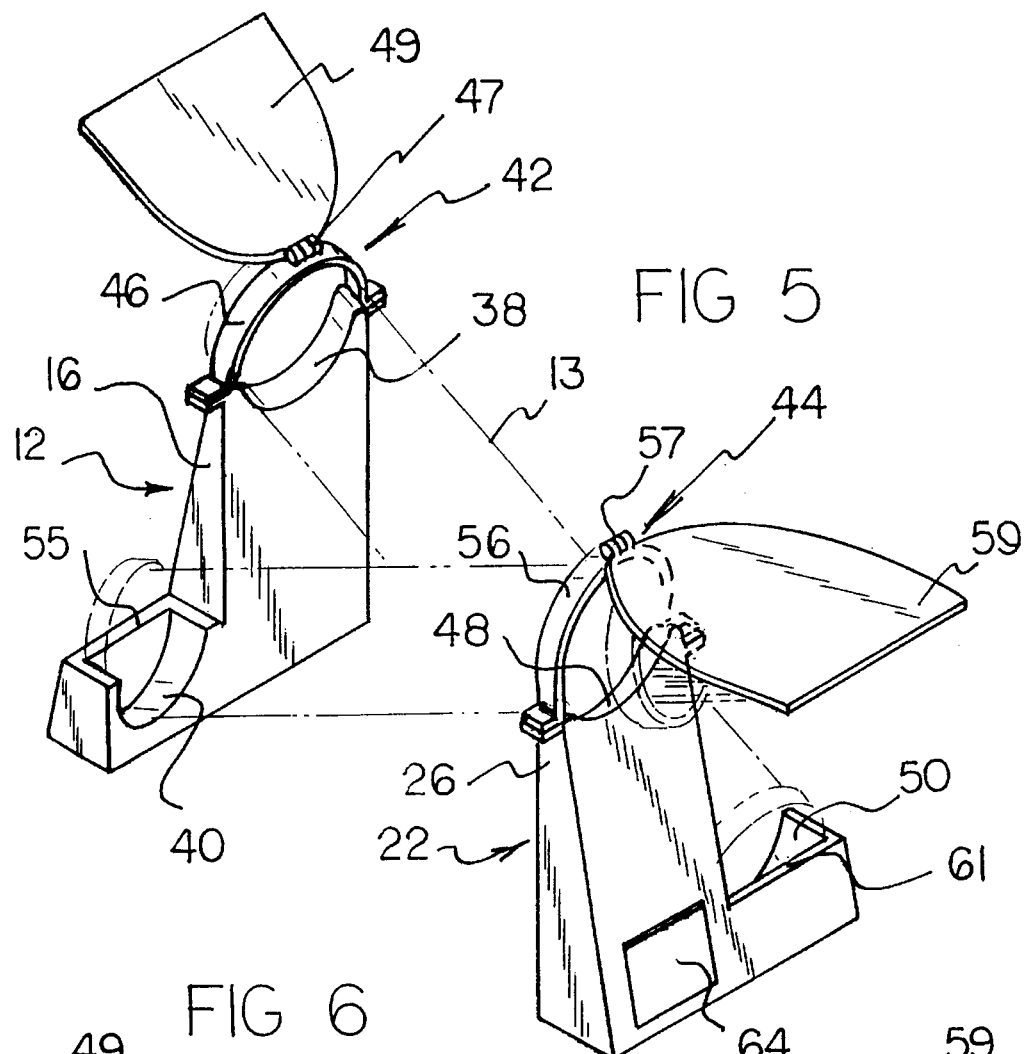
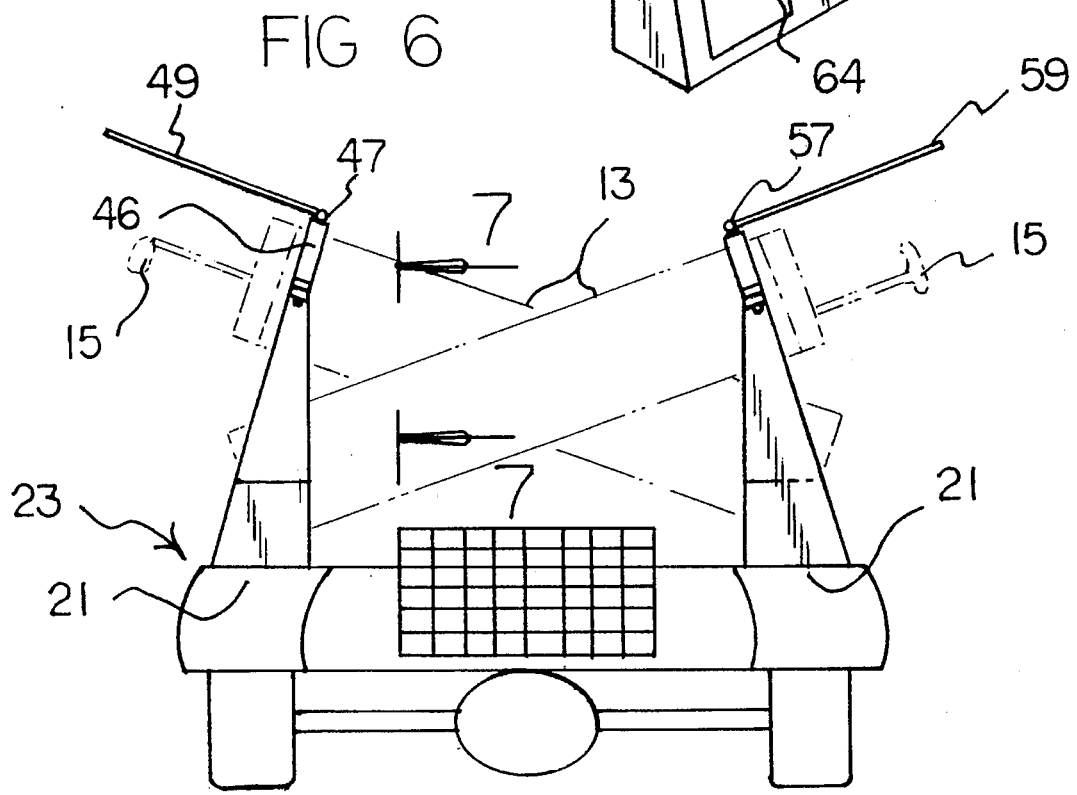

GOLF BAG HOLDER APPARATUS

BACKGROUND OF THE INVENTION

1. Field of the Invention

The present invention relates generally to devices for holding golf bags and, more particularly, to devices for holding and transporting golf bags on a golf course.

2. Description of the Prior Art

When golf bags are transported on a golf course, they are often transported in golf bag holders on wheeled vehicles. When the wheeled vehicle is a motorized cart, the golf bag is often placed in a golf bag holder in a straight up vertical position. With the golf bag in such a position, there is a tendency of the golf clubs contained within the bag to bounce around and rattle as the motorized cart rides over the terrain of the golf course. In this respect, it would be desirable if a holder for a golf bag retained the golf bag and the clubs contained therein in a slanted orientation to help preclude the clubs from bouncing around and rattling as the motorized cart rides of the terrain of the golf course.

There are holders for golf bags which employ straps for securing the golf bag to the holder. Yet, oftentimes, the straps work loose, and the golf bag can be lost. In this respect, it would be desirable if a holder for a golf bag did not employ straps for securing the golf bag to the holder.

When it is anticipated that golf clubs will be bounced around quite a bit when in a golf bag in a holder, often protective sleeves are placed on each individual golf club to prevent or reduce damage due to being bounced around. Yet the placement, removal, and replacement of protective sleeves on individual golf clubs can be regarded as an inconvenience that it would be desirable to avoid. If would be desirable, therefore, if the bouncing around of golf clubs in a golf bag could be reduced sufficiently so that it would not be necessary to place protective sleeves on individual golf clubs.

Unexpected cloudbursts often occur while a person is on a golf course. During such times, it would be desirable to protect the golf clubs and the interior of the golf bag from the rain. In this respect, it would be desirable if a holder for a golf bag included a provision for protecting the golf clubs and the interior of the golf bag from rain.

Often more than one person share a motorized golf cart. Therefore, when the golf cart stops, more than one person may attempt to approach a respective golf bag at the same time. If a plurality of golf bags are arrayed on one side of the cart, then a plurality of persons may bump into one another or otherwise interfere with one another is attempting to get golf clubs out of the respective bags. To avoid interference between each other of plural persons, it would be desirable if access to plural golf bags is obtained on opposite sides of a motorized cart. One player can approach one golf bag on one side of a motorized cart, and another player can approach another golf bag on another side of the motorized cart without either player interfering with the other.

Throughout the years, a number of innovations have been developed relating to storage or transportation devices for golf bags, and the following U.S. patents are representative of some of those innovations: U.S. Pat. Nos. 3,580,533; 5,076,651; 5,088,635; 5,199,581; 5,215,194; and U.S. Pat. No. Des. 269,472.

More specifically, U.S. Pat. No. 5,088,635 relates to supports for golf bags on motorized carts. U.S. Pat. No. 5,088,635 shows two golf bag racks attached to two different fenders of a motorized cart. The racks extend longitudinally out from the rear of the motorized cart. The racks are made from essentially flat planar support structures, whereby the racks are devoid of any internal storage space. However, it would be desirable if the support structures on a motorized cart for golf bags would have internal storage spaces for storing miscellaneous items, such as golf balls and tees. Moreover, with the rearwardly longitudinally extending arrangement of the two racks shown in U.S. Pat. No. 5,088,635, both golf bags need to be approached from the rear of the motorized cart. Such an arrangement may cause interference between different players. On the other hand, as stated above, it would be desirable if a golf bag could be approached from the side of the motorized cart. Therefore, two different players would approach from two different sides of the motorized cart.

U.S. Pat. No. Des. 269,472 discloses a golf bag carrier for a motorized cart which stores a golf bag in a vertical orientation. Problems associated with a vertical orientation of a golf bag are discussed above.

U.S. Pat. Nos. 3,580,533 and 5,215,194 disclose manually pulled carriers for golf bags. When the golf bags are pulled along, they are in a slanted orientation. However, when the golf bags are at rest, they are in a vertical orientation.

U.S. Pat. Nos. 5,076,651 and 5,199,581 disclose stationary racks for golf bags which store the golf bags in a vertical orientation.

Still other features would be desirable in a golf bag holder apparatus. For example, for storing a plurality of golf bags, it would be desirable if plural supports could be made in modular form. Therefore, by combining modules, plural supports could be readily provided.

Thus, while the foregoing body of prior art indicates it to be well known to use storage racks for golf bags on motorized carts, the prior art described above does not teach or suggest a golf bag holder apparatus which has the following combination of desirable features: (1) retains a golf bag and the clubs contained therein in a slanted orientation to help preclude the clubs from bouncing around and rattling as a motorized cart rides on the terrain of the golf course; (2) does not employ straps for securing the golf bag to the golf bag holder; (3) sufficiently reduces bouncing around of golf clubs in a golf bag so that it would not be necessary to place protective sleeves on individual golf clubs; (4) provides for protecting the golf clubs and the interior of the golf bag from rain; (5) provides access to plural golf bags on opposite sides of a motorized cart; (6) provides the support structures for golf bags on a motorized cart with internal storage spaces for storing miscellaneous items, such as golf balls and tees; and (7) provides plural supports in modular form. The foregoing desired characteristics are provided by the unique golf bag holder apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a golf bag holder apparatus which is adapted to be supported by a sub-base support and which includes a first support assembly which includes a first base, a first high-form bag support assembly supported by the first base, and a first low-form bag support assembly supported by the first base adjacent to the first high-form bag support assembly. The first low-form bag support assembly includes a first bag retention portion projecting upward from the first base. The golf bag holder apparatus also includes a second support assembly includes a second base, a second high-form bag support assembly supported by the second base, and a second low-form bag support assembly supported by the second base adjacent to the second high-form bag support assembly. The second low-form bag support assembly includes a second bag retention portion projecting upward from the second base. The sub-base support is adapted to support the first support assembly and the second support assembly such that the first high-form bag support assembly is located opposite the second low-form bag support assembly and such that the second high-form bag support assembly is located opposite the first low-form bag support assembly.

In one embodiment of the invention, a transverse strut is connected between the first high-form bag support assembly and the second high-form bag support assembly such that the first high-form bag support assembly is located opposite the second low-form bag support assembly and such that the second high-form bag support assembly is located opposite the first low-form bag support assembly.

The first base extends along a first longitudinal axis; the second base extends along a second longitudinal axis; and the first longitudinal axis and second longitudinal axis are substantially parallel to each other. The transverse strut extends along a third longitudinal axis which is substantially perpendicular to the first longitudinal axis and the second longitudinal axis.

The first high-form bag support assembly includes a first concavely-shaped high-form support portion. The first low-form bag support assembly includes a first concavely-shaped low-form support portion. The second high-form bag support assembly includes a second concavely-shaped high-form support portion. The second low-form bag support assembly includes a second concavely-shaped low-form support portion.

A first rain shield assembly is connected to the first high-form bag support assembly, and a second rain shield assembly is connected to the second high-form bag support assembly. The first rain shield assembly includes a first shield support member adapted for connection to the first high-form bag support assembly. A first hinge is connected to the first shield support member, and a first shield member is connected to the first hinge. The second rain shield assembly includes a second shield support member adapted for connection to the second high-form bag support assembly. A second hinge is connected to the second shield support member, and a second shield member is connected to the second hinge. The first high-form bag support assembly includes exterior walls which define an interior storage chamber. One of the exterior walls includes a door assembly which permits access to the interior storage chamber.

It is therefore an object of the present invention to provide a new and improved golf bag holder apparatus which has all of the advantages of the prior art and none of the disadvantages.

It is another object of the present invention to provide a new and improved golf bag holder apparatus which may be easily and efficiently manufactured and marketed.

It is a further object of the present invention to provide a new and improved golf bag holder apparatus which is of durable and reliable construction.

An even further object of the present invention is to provide a new and improved golf bag holder apparatus which is susceptible of a low cost of manufacture with regard to both materials and labor, and which accordingly is then susceptible of low prices of sale to the consuming public, thereby making such golf bag holder apparatus available to the buying public.

Still yet a further object of the present invention is to provide a new and improved golf bag holder apparatus which retains a golf bag and the clubs contained therein in a slanted orientation to help preclude the clubs from bouncing around and rattling as a motorized cart rides on the terrain of the golf course.

Still another object of the present invention is to provide a new and improved golf bag holder apparatus that does not employ straps for securing the golf bag to the golf bag holder.

Yet another object of the present invention is to provide a new and improved golf bag holder apparatus which sufficiently reduces bouncing around of golf clubs in a golf bag so that it would not be necessary to place protective sleeves on individual golf clubs.

Even another object of the present invention is to provide a new and improved golf bag holder apparatus that provides for protecting the golf clubs and the interior of the golf bag from rain.

Still a further object of the present invention is to provide a new and improved golf bag holder apparatus which provides access to plural golf bags on opposite sides of a motorized cart.

Yet another object of the present invention is to provide a new and improved golf bag holder apparatus that provides the support structures for golf bags on a motorized cart with internal storage spaces for storing miscellaneous items, such as golf balls and tees.

Still another object of the present invention is to provide a new and improved golf bag holder apparatus which provides plural supports in modular form.

Yet still another object of the present invention is to provide a new and improved golf bag holder apparatus that provides the support structures for golf bags on a motorized cart which enables the golf clubs to be transported in a position facilitating ease of identification, withdrawal and replacement during use thereof.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 5 is a perspective view of a second embodiment of the invention wherein provisions are provided for protecting golf clubs from rain and for storing miscellaneous items.

FIG. 6 is a rear view of a motorized cart with the embodiment of the invention shown in FIG. 5 installed thereon.

DESCRIPTION OF THE PREFERRED EMBODIMENT

Figure 1:
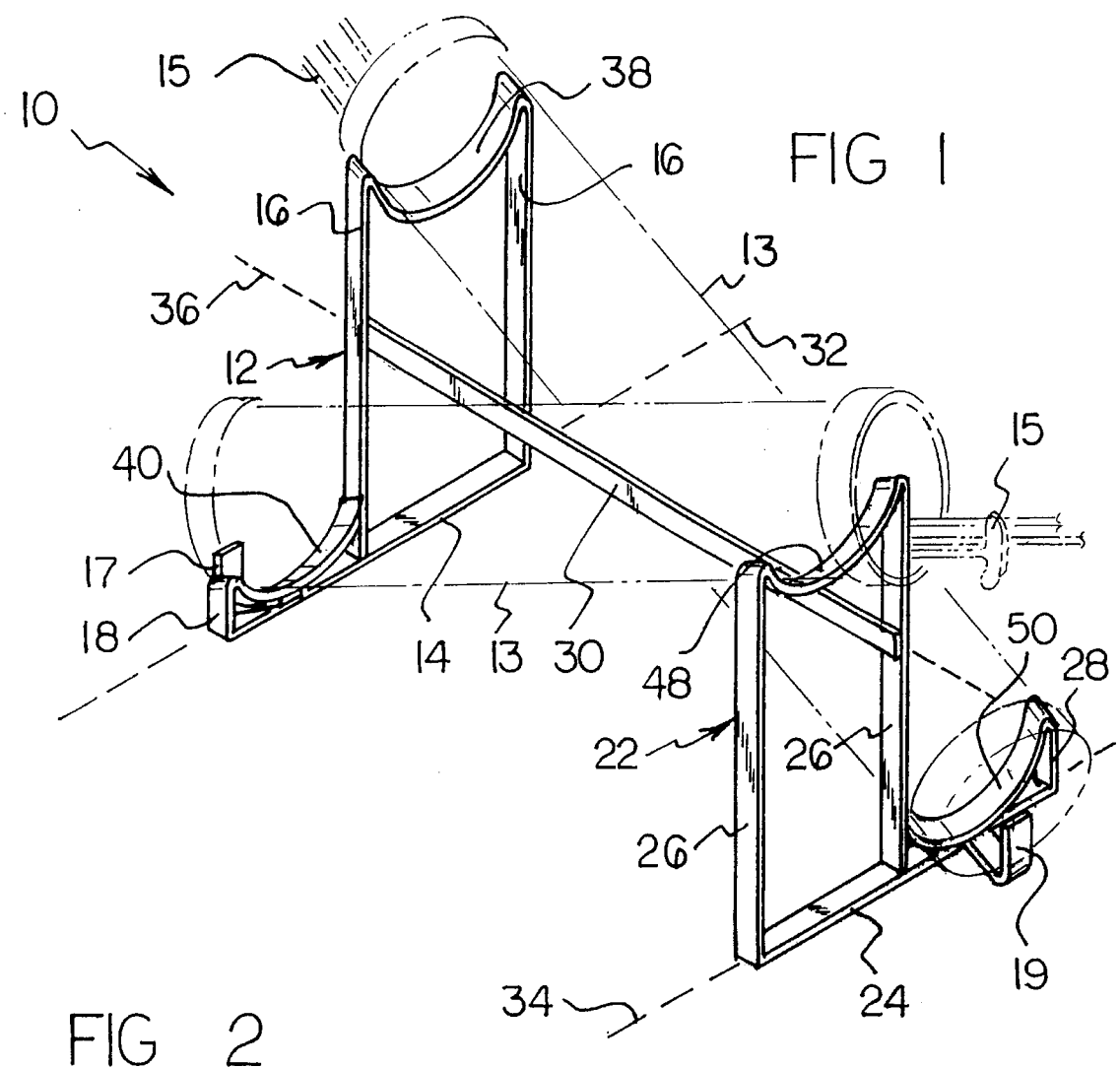
FIG. 1 is a perspective view showing a preferred embodiment of a first embodiment of the golf bag holder apparatus of the invention with golf bags and clubs shown in broken lines.

With reference to the drawings, a new and improved golf bag holder apparatus embodying the principles and concepts of the present invention will be described.

Turning to FIGS. 1–4, there is shown a first embodiment of the golf bag holder apparatus of the invention generally designated by reference numeral 10. In its preferred form, golf bag holder apparatus 10 is adapted to be supported by sub-base support 21 and includes a first support assembly 12 which includes a first base 14, a first high-form bag support assembly 16 supported by the first base 14, and a first low-form bag support assembly 18 supported by the first base 14 adjacent to the first high-form bag support assembly 16. The first low-form bag support assembly 18 includes a first bag retention portion 17 projecting upward from the first base 14. The golf bag holder apparatus 10 also includes a second support assembly 22 which includes a second base 24, a second high-form bag support assembly 26 supported by the second base 24, and a second low-form bag support assembly 28 supported by the second base 24 adjacent to the second high-form bag support assembly 26. The second low-form bag support assembly 28 includes a second bag retention portion 19 projecting upward from the second base 24. The sub-base support 21 is adapted to support the first support assembly 12 and the second support assembly 22 such that the first high-form bag support assembly 16 is located opposite the second low-form bag support assembly 28 and such that the second high-form bag support assembly 26 is located opposite the first low-form bag support assembly 18.

In one embodiment of the invention, a transverse strut 30 is connected between the first high-form bag support assembly 16 and the second high-form bag support assembly 26 such that the first high-form bag support assembly 16 is located opposite the second low-form bag support assembly 28 and such that the second high-form bag support assembly 26 is located opposite the first low-form bag support assembly 18.

As shown in FIGS. 1–4, the transverse strut 30 is used to properly orient the first support assembly 12 with respect to the second support assembly 22 irrespective of the sub-base support 21. In fact, by using the transverse strut 30 to connect the first support assembly 12 and the second support assembly 22 together, the entire golf bag holder apparatus 10 of the invention can be moved and carried as a unified unit. If desired, the golf bag holder apparatus 10 can be rested on a sub-base support 21, such as a motorized cart 23 or even the ground surface, without it being attached thereto.

The first base 14 extends along a first longitudinal axis 32; the second base 24 extends along a second longitudinal axis 34; and the first longitudinal axis 32 and second longitudinal axis 34 are substantially parallel to each other. The transverse strut 30 extends along a third longitudinal axis 36 which is substantially perpendicular to the first longitudinal axis 32 and the second longitudinal axis 34.

The first high-form bag support assembly 16 includes a first concavely-shaped high-form support portion 38. The first low-form bag support assembly 18 includes a first concavely-shaped low-form support portion 40. The second high-form bag support assembly 26 includes a second concavely-shaped high-form support portion 48. The second low-form bag support assembly 28 includes a second concavely-shaped low-form support portion 50. Golf bags 13, containing golf clubs 15, are generally cylindrically shaped and rest in the respective concavely-shaped support portions 38, 40, 48, and 50.

Figure 2:
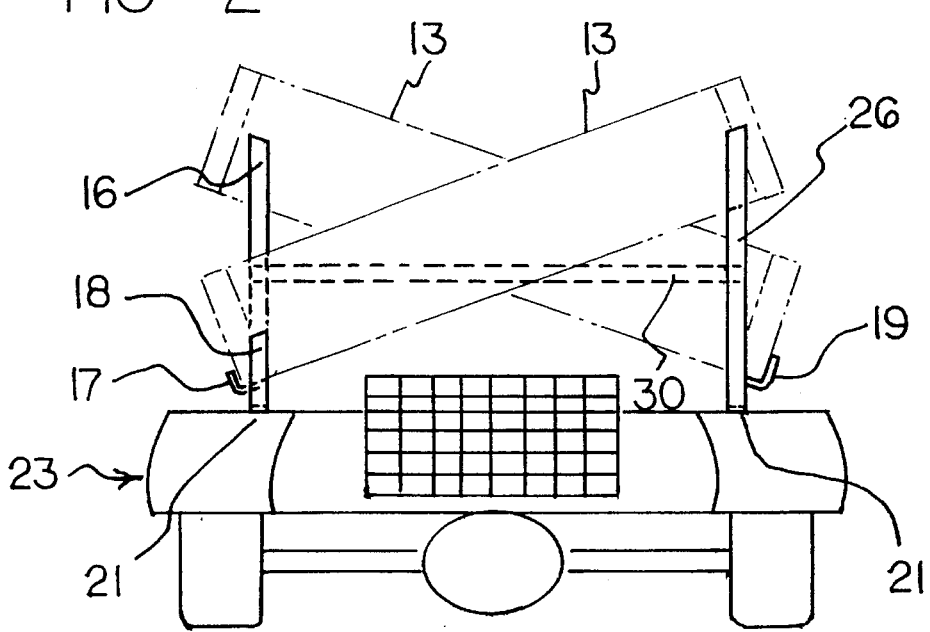
FIG. 2 is a rear view of a motorized cart with the embodiment of the golf bag holder apparatus shown in FIG. 1 installed thereon.
Figure 3:
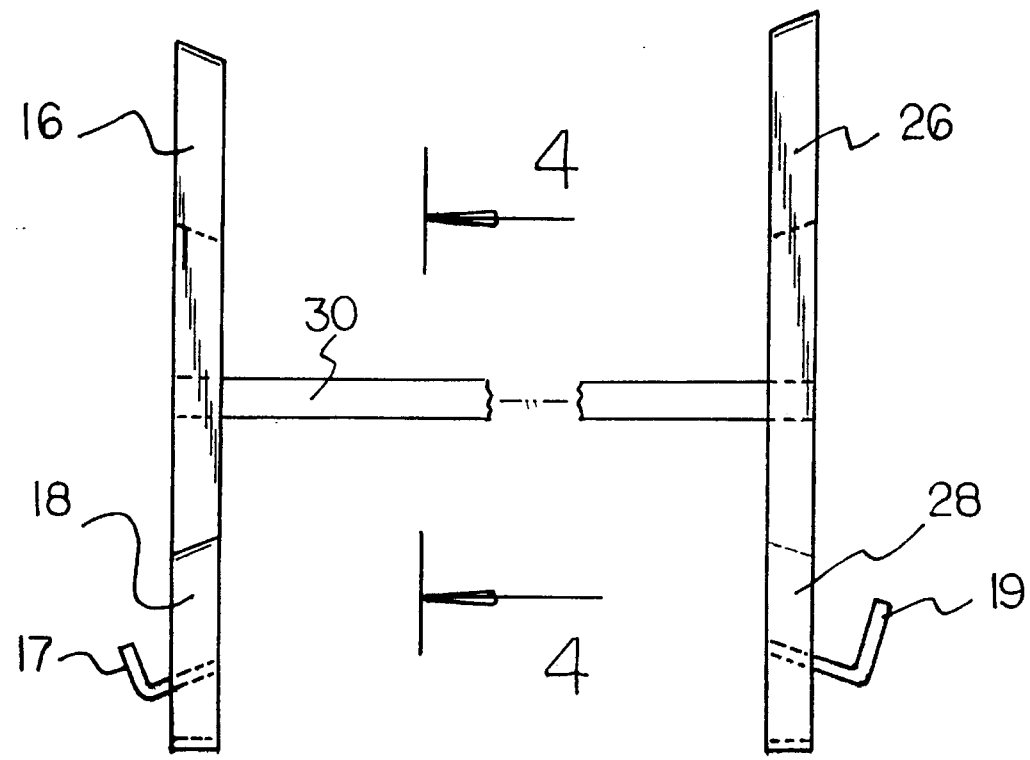
FIG. 3 is an enlarged, partially broken view, of the embodiment of the invention shown in FIG. 2 removed from the motorized cart.
Figure 4:
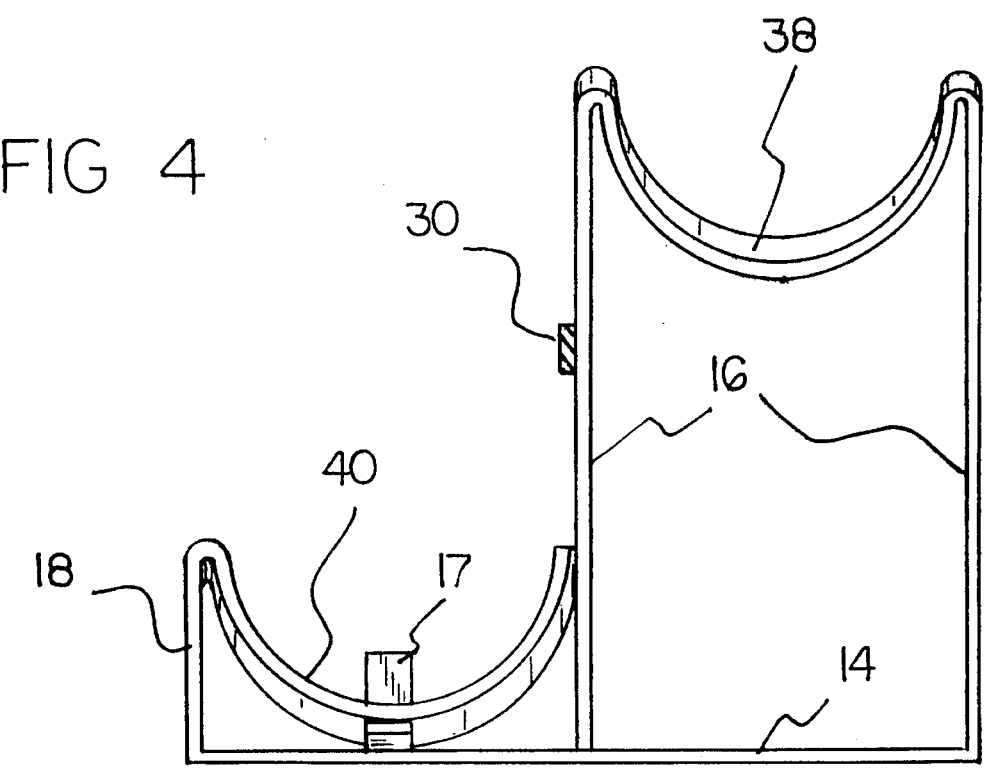
FIG. 4 is an inside view of a portion of the embodiment of the invention shown in FIG. 3 taken along line 4—4 of FIG. 3.
Figure 7:
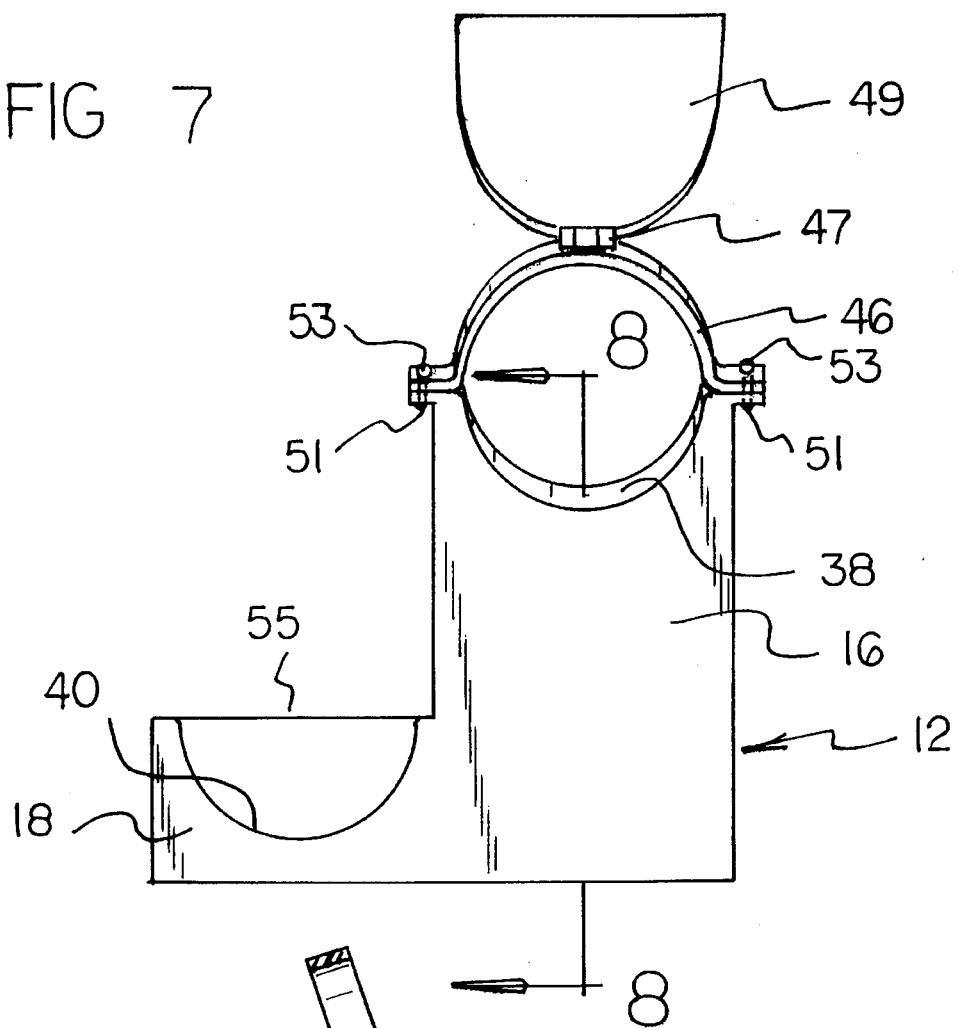
FIG. 7 is an enlarged inside view of a portion of the embodiment of the invention shown in FIG. 6 taken along line 7—7 of FIG. 6.

As shown in FIGS. 2 and 6, the sub-base support 21 is comprised of rear portions of a motorized cart 23. More specifically, each embodiment of the invention is connected to the sub-base support 21. Nuts and bolts (not shown) can be used to connect the embodiments of the invention to the motorized cart 23.

In using the first embodiment of the invention, a first golf bag 13 is placed so that the bottom portion of the first golf bag 13 rests on the first concavely-shaped low-form support portion 40 of the first low-form bag support assembly 18, and the top portion of the first golf bag 13 rests on the second concavely-shaped high-form support portion 48 of the second high-form bag support assembly 26. The floor of the first golf bag 13 rests up against the first bag retention portion 17 of the first low-form bag support assembly 18. Conversely, a second golf bag 13 is placed so that the bottom portion of the second golf bag 13 rests on the second concavely-shaped low-form support portion 50 of the second low-form bag support assembly 28, and the top portion of the second golf bag 13 rests on the first concavely-shaped high-form support portion 38 of the first high-form bag support assembly 16. The floor of the second golf bag 13 rests up against the second bag retention portion 19 of the second low-form bag support assembly 28. With such an arrangement of golf bags 13, when the sub-base support 21 is a motorized cart 23, and when the golf bag holder apparatus 10 of the invention is placed on the rear of the motorized cart 23, one golf bag 13 faces the right side of the motorized cart 23, and the other golf bag 13 faces the left side of the motorized cart 23.

Turning to FIGS. 5–8, a second embodiment of the invention is shown. Reference numerals are shown that correspond to like reference numerals that designate like elements shown in the other figures. In addition, first rain shield assembly 42 is connected to the first high-form bag support assembly 16, and a second rain shield assembly 44 is connected to the second high-form bag support assembly 26. The first rain shield assembly 42 includes a first shield support member 46 adapted for connection to the first high-form bag support assembly 16. A first hinge 47 is connected to the first shield support member 46, and a first shield member 49 is connected to the first hinge 47. The second rain shield assembly 44 includes a second shield support member 56 adapted for connection to the second high-form bag support assembly 26. A second hinge 57 is connected to the second shield support member 56, and a second shield member 59 is connected to the second hinge 57. Nuts 51 and bolts 53 are used to secure the first shield support member 46 to the first high-form bag support assembly 16. Similarly, nuts and bolts are used to secure the second shield support member 56 to the second high-form bag support assembly 26.

In using the first rain shield assembly 42, a top portion of a golf bag 13 is rested upon the first concavely-shaped high-form support portion 38 of the first high-form bag support assembly 16, and the first shield support member 46 is secured with bolts to the first high-form bag support assembly 16. When the first shield member 49 is raised with respect to the opening of the golf bag 13, the golf clubs 15 in the golf bag 13 can be placed into and taken out of the golf bag 13. However, when the first shield member 49 is to perform a rain-shielding function, the first shield member 49 is lowered around the first hinge 47 to a position generally parallel to the longitudinal axis of golf bag 13, as substantially shown in FIG. 6, to extend beyond the open end of the golf bag sufficiently to cover the opening of the golf bag 13, thereby shielding the contents of the golf bag 13 from rain. The second shield member 59 operates in an analogous manner with respect to the second hinge 57 and the second shield support member 56 for another golf bag 13 whose top portion is supported by the second concavely-shaped high-form support portion 48.

In the second embodiment of the invention, the first bag retention portion is in the form of a first low-form wall 55 adjacent to the first concavely-shaped low-form support portion 40. In addition, the second bag retention portion is in the form of a second low-form wall 61 adjacent to the second concavely-shaped low-form support portion 50. The first concavely-shaped high-form support portion 38 is half-circle-shaped; the first shield support member 46 is half-circle-shaped; the second concavely-shaped high-form support portion 48 is half-circle-shaped; and the second shield support member 56 is half-circle-shaped.

Also, in the second embodiment of the invention, The first high-form bag support assembly 16 includes exterior walls 60 which define an interior storage chamber 62. One of the exterior walls 60 includes a door assembly 64 which permits access to the interior storage chamber 62.

Figure 8:
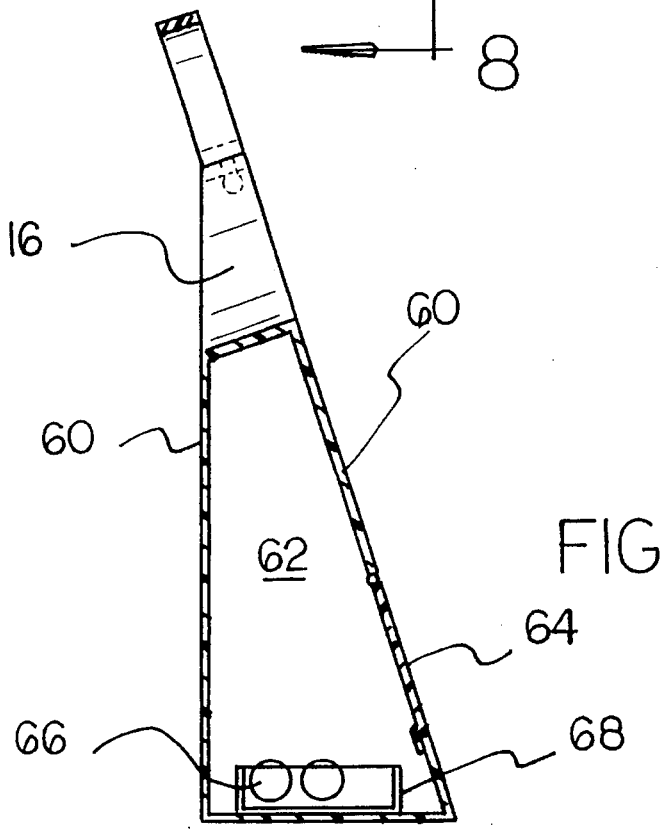
FIG. 8 is an enlarged cross-sectional view of the embodiment of the invention shown in FIG. 7 taken along line 8—8 of FIG. 7.

As shown in FIG. 8, the interior storage chamber 62 can be used for storing miscellaneous items such as golf balls 66 which are retained in a tray 68.

It is noted that for both the first and second embodiments of the invention, the first support assembly 12 is in the form of a module which is substantially identical to the second support assembly 22 which is also in the form of a module.

The components of the golf bag holder apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved golf bag holder apparatus that is low in cost, relatively simple in design and operation, and which may advantageously be used to retain a golf bag and the clubs contained therein in a slanted orientation to help preclude the clubs from bouncing around and rattling as a motorized cart rides on the terrain of the golf course. With the invention, a golf bag holder apparatus is provided which does not employ straps for securing the golf bag to the golf bag holder. With the invention, a golf bag holder apparatus is provided which sufficiently reduces bouncing around of golf clubs in a golf bag so that it would not be necessary to place protective sleeves on individual golf clubs. With the invention, a golf bag holder apparatus provides for protecting the golf clubs and the interior of the golf bag from rain. With the invention, a golf bag holder apparatus provides access to plural golf bags on opposite sides of a motorized cart. With the invention, a golf bag holder apparatus provides the support structures for golf bags on a motorized cart with internal storage spaces for storing miscellaneous items, such as golf balls and tees. With the invention, a golf bag holder apparatus provides plural supports made in modular form. Further with the invention, a golf bag holder apparatus provides support structures for golf bags on a motorized cart which enables the golf clubs to be transported in a position facilitating ease of identification, withdrawal and replacement during use thereof.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A golf bag holder apparatus, comprising:

a first support assembly which includes a first base, a first high-form bag support assembly supported by said first base, and a first low-form bag support assembly supported by said first base adjacent to said first high-form bag support assembly, wherein said first low-form bag support assembly includes a first bag retention portion projecting upward from said first base, and a second support assembly which includes a second base, a second high-form bag support assembly supported by said second base, and a second low-form bag support assembly supported by said second base adjacent to said second high-form bag support assembly, wherein said second low-form bag support assembly includes a second bag retention portion projecting upward from said second base, longitudinal spacer means connected between said first support assembly and said second support assembly such that said first high-form bag support assembly is spaced opposite said second low-form bag support assembly and such that said second high-form bag support assembly is spaced opposite said first low-form bag support assembly.

2. The apparatus of claim 1, wherein:

said longitudinal spacer means comprises a transverse strut connected between said first high-form bag support assembly and said second high-form bag support assembly.

3. The apparatus of claim 2 wherein:

said first base extends along a first longitudinal axis, said second base extends along a second longitudinal axis, said first longitudinal axis and second longitudinal axis are substantially parallel to each other, and said transverse strut extends along a third longitudinal axis which is substantially perpendicular to said first longitudinal axis and said second longitudinal axis.

4. The apparatus of claim 1 wherein:

said first high-form bag support assembly includes a first concavely-shaped high-form support portion, said first low-form bag support assembly includes a first concavely-shaped low-form support portion, said second high-form bag support assembly includes a second concavely-shaped high-form support portion, and said second low-form bag support assembly includes a second concavely-shaped low-form support portion.

5. The apparatus of claim 1, further including:

a first rain shield assembly connected to said first high-form bag support assembly, and a second rain shield assembly connected to said second high-form bag support assembly.

6. The apparatus of claim 5 wherein said first rain shield assembly includes:

a first shield support member adapted for connection to said first high-form bag support assembly, a first hinge connected to said first shield support member, and a first shield member connected to said first hinge.

7. The apparatus of claim 5 wherein said second rain shield assembly includes:

a second shield support member adapted for connection to said second high-form bag support assembly, a second hinge connected to said second shield support member, and a second shield member connected to said second hinge.

8. The apparatus of claim 1 wherein said first high-form bag support assembly includes exterior walls which define an interior storage chamber.

9. The apparatus of claim 8 wherein one of said exterior walls includes a door assembly which permits access to said interior storage chamber.

* * * * *